(12) United States Patent
Schneider et al.

(10) Patent No.: US 9,449,188 B2
(45) Date of Patent: Sep. 20, 2016

(54) INTEGRATION USER FOR ANALYTICAL ACCESS TO READ ONLY DATA STORES GENERATED FROM TRANSACTIONAL SYSTEMS

(71) Applicant: salesforce.com, inc., San Francisco, CA (US)

(72) Inventors: Donovan Schneider, San Francisco, CA (US); Fred Im, San Carlos, CA (US); Vijayasarathy Chakravarthy, Mountain View, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/512,249

(22) Filed: Oct. 10, 2014

(65) Prior Publication Data

US 2016/0104003 A1   Apr. 14, 2016

(51) Int. Cl.
*H04L 29/06* (2006.01)
*G06F 21/62* (2013.01)
*G06F 17/30* (2006.01)

(52) U.S. Cl.
CPC ..... *G06F 21/6218* (2013.01); *G06F 17/30377* (2013.01); *G06F 17/30563* (2013.01); *H04L 63/08* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 6,757,689 B2 | 6/2004 | Battas et al. | |
| 6,995,768 B2 | 2/2006 | Jou et al. | |
| 7,228,352 B1* | 6/2007 | Yaguchi | G06F 11/1662 709/229 |
| 7,356,840 B1* | 4/2008 | Bedell | G06F 17/30528 726/1 |
| 7,380,213 B2 | 5/2008 | Pokorny et al. | |
| 7,571,191 B2 | 8/2009 | Dill et al. | |
| 7,836,178 B1 | 11/2010 | Bedell et al. | |
| 8,041,670 B2 | 10/2011 | Bakalash et al. | |
| 8,086,585 B1* | 12/2011 | Brashers | G06F 17/30097 707/705 |
| 8,285,709 B2 | 10/2012 | Candea et al. | |
| 8,549,602 B2* | 10/2013 | Vaeth | H04L 9/3234 713/156 |
| 8,793,759 B2* | 7/2014 | Nishizawa | H04L 29/06768 726/1 |
| 8,826,390 B1* | 9/2014 | Varda | G06F 21/6218 726/4 |
| 2005/0182684 A1* | 8/2005 | Dawson | G06Q 30/06 705/80 |
| 2010/0169268 A1* | 7/2010 | John | G06F 17/30592 707/607 |
| 2011/0167256 A1* | 7/2011 | Lee | H04L 63/20 713/156 |

(Continued)

FOREIGN PATENT DOCUMENTS

WO   WO 2013/045898 A2 *  4/2013   ............. G06Q 30/06

OTHER PUBLICATIONS

U.S. Appl. No. 14/512,230—"Row-Level Security Integration of Analytical Data Store with Cloud Architecture", inventors Donovan Schneider et al., filed Oct. 10, 2014, 39 pages.

(Continued)

*Primary Examiner* — Christopher Revak
(74) *Attorney, Agent, or Firm* — Haynes Beffel & Wolfeld LLP; Ernest J. Beffel, Jr.

(57) ABSTRACT

The technology disclosed preserves the tenant specificity and user specificity of the tenant data by associating user IDs to complementary special IDs referred to as the integration user(s). In particular, it combines the traceability of user actions, the integration of security models and the flexibility of a service ID into one integration user(s).

12 Claims, 8 Drawing Sheets

Integration User Application

(56) References Cited

U.S. PATENT DOCUMENTS

| | | | | |
|---|---|---|---|---|
| 2014/0258970 | A1* | 9/2014 | Brown | G06F 8/47 717/103 |
| 2014/0372319 | A1* | 12/2014 | Wolovitz | G06Q 30/06 705/71 |
| 2015/0032620 | A1* | 1/2015 | Castinado | G06Q 20/40 705/44 |
| 2015/0058931 | A1* | 2/2015 | Miu | H04L 63/126 726/3 |
| 2015/0120567 | A1* | 4/2015 | Van Rooyen | G06Q 20/3829 705/59 |
| 2015/0317748 | A1* | 11/2015 | Roberts | G06Q 40/12 705/30 |

OTHER PUBLICATIONS

U.S. Appl. No. 14/512,240—"Low Latency Architecture with Directory Service for Integration of Transactional Data System with Analytical Data Structures", inventors: Donovan Schneider et al., filed Oct. 10, 2014, 35 pages.

Davis, Chris, Graphite Documentation Release 0.10.0, Sep. 16, 2014, 135 pgs.

GitHub exbz Description of Graphite UI, 2014, 13 pgs. [Retrieved Sep. 16, 2014 3:06:56 PM], Retrieved from Internet: <https://github.com/ezbz/graphitus>.

ExactTarget, "The Future of Marketing Starts Here", Mar. 1, 2013, [retreived Mar. 1, 2013], Retreived from Internet <http://www.exacttarget.com>, http://web.archive.org/web/20130301133331/http://www.exacttarget.com/.

Agrawala, Maneesh, "Animated Transitions in Statistical Data Graphics", 3 pgs, Sep. 22, 2009, [Retrieved Sep. 12, 2014 9:00:30 AM] Retrieved from Internet <https://www.youtube.com/watch?v=vLk7mlAtEXI&feature=youtu.be>.

Segel, Edward et al. "Narrative Visualization: Telling Stories with Data", Mar. 31, 2010, http://vis.stanford.edu/papers/narrative, 10 pgs.

Heer, Jeffrey, et al., "Animated Transitions in Statisical Data Graphics", Mar. 31, 2007, 10 pgs.

Demiralp, C., et al., "Visual Embedding, A Model for Visualization", Visualization Viewpoints, IEEE Computer Graphics and Applications, Jan./Feb. 2014, p. 6-11.

Stanford Vis group / Papers, "Visualization Papers, 2014-2001", retrieved from http://vis.stanford.edu/papers on Sep. 12, 2014, 8 pages.

U.S. Appl. No. 14/512,258—U.S. Non-provisional Application titled "Visual Data Analysis with Animated Informaiton al Morphing Replay", inventors: Didier Prophete and Vijay Chakravarthy, filed Oct. 10, 2014, 56 pages.

"Salesforce Analytics Cloud Implementation and Data Integration Guide", Summer '14 Pilot—API version 31.0, last updated: Sep. 8, 2014, 87 pages.

U.S. Appl. No. 14/512,263—"Declarative Specification of Visualization Queries, Display Formats and Bindings", inventors Didier Prophete et al., filed Oct. 10, 2014, 58 pages.

U.S. Appl. No. 14/512,267—"Dashboard Builder with Live Data Updating Without Exiting an Edit Mode", Inventors: Didier Prophete et al., filed Oct. 10, 2014, 55 pages.

"Occasionally Connected Applications (Local Database Caching)", downloaded on Sep. 11, 2014, from http://msdn.microsoft.com/en-us/library/vstudio/bb384436(v=vs.100).aspx, 3 pages.

U.S. Appl. No. 14/512,274—"Offloading Search Processing Against Analytic Data Stores", Inventors Fred Im et al., filed Oct. 10, 2014, 40 pages.

EgdeSpring Legacy Content, (approx. 2012), 97 pages.

"Stuff I've Seen: A System for Personal Information Retrieval and Re-Use," by Dumais et al. IN: SIGIR '03 (2003). Available at: ACM.

Pedersen et al, "Query Optimization for OLAP-XML Federations" ACM, Nov. 8, 2002, pp. 57-64.

Rao et al, "Spatial Hierarchy and OLAP-Favored Search in Spatial Data Warehouse", ACM, New Orleans, LA., Nov. 7, 2003, pp. 48-55.

U.S. Appl. No. 14/512,240—Office Action dated Oct. 15, 2015, 17 pages.

U.S. Appl. No. 14/512,240—Notice of Allowance dated Mar. 16, 2016, 10 pages.

\* cited by examiner

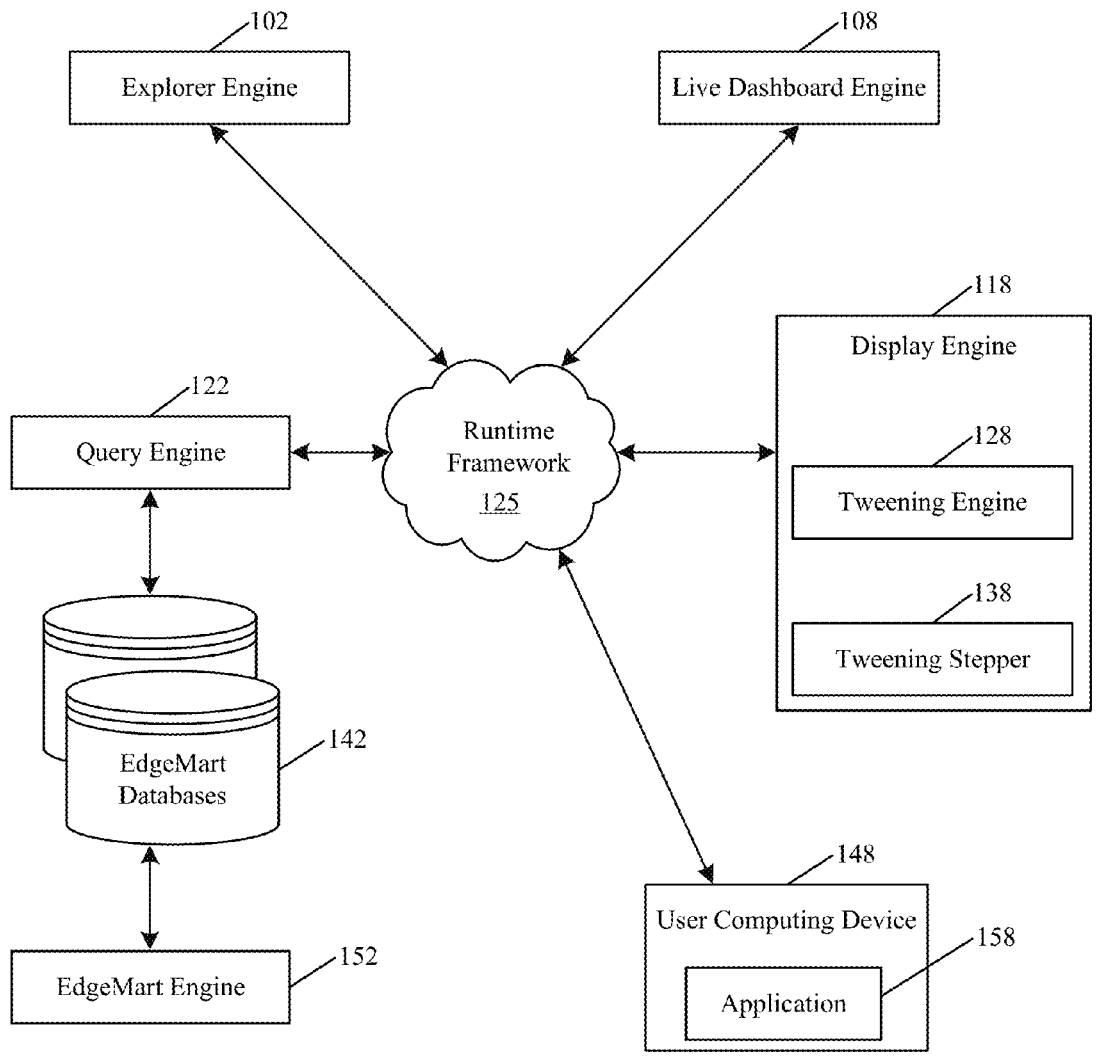
FIG. 1 – Analytics Environment

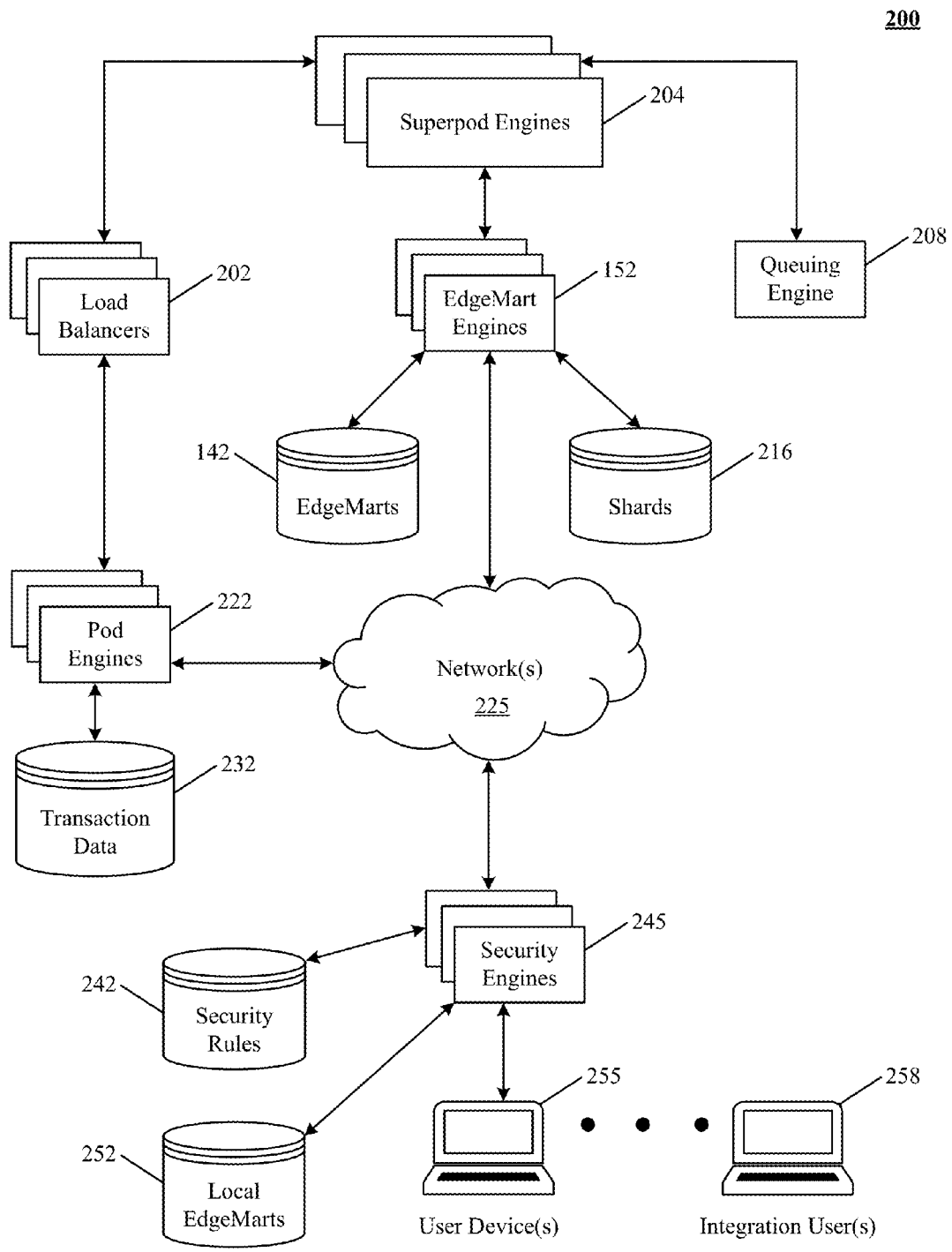
FIG. 2 – Integration Environment

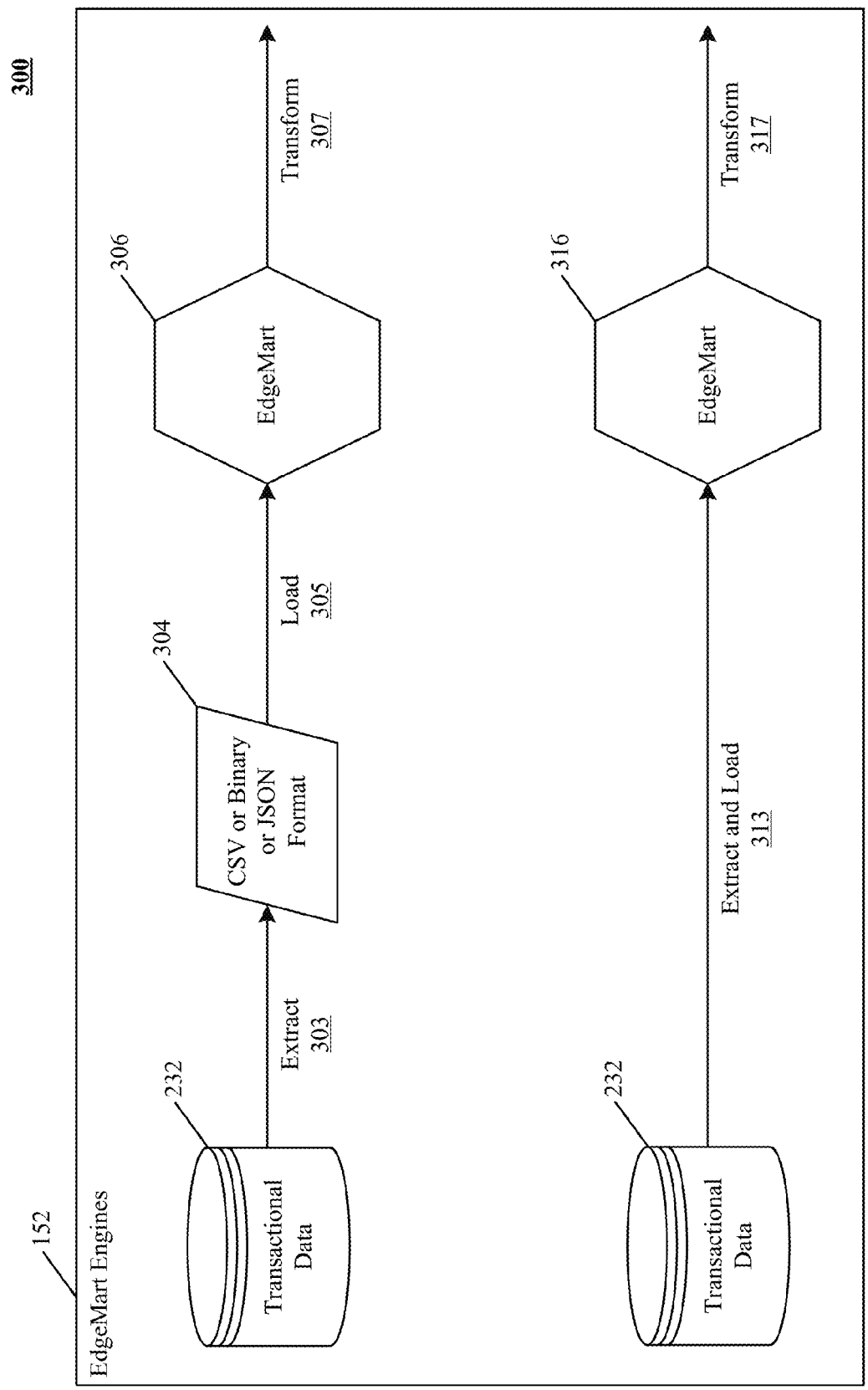
FIG. 3 – ELT Workflow

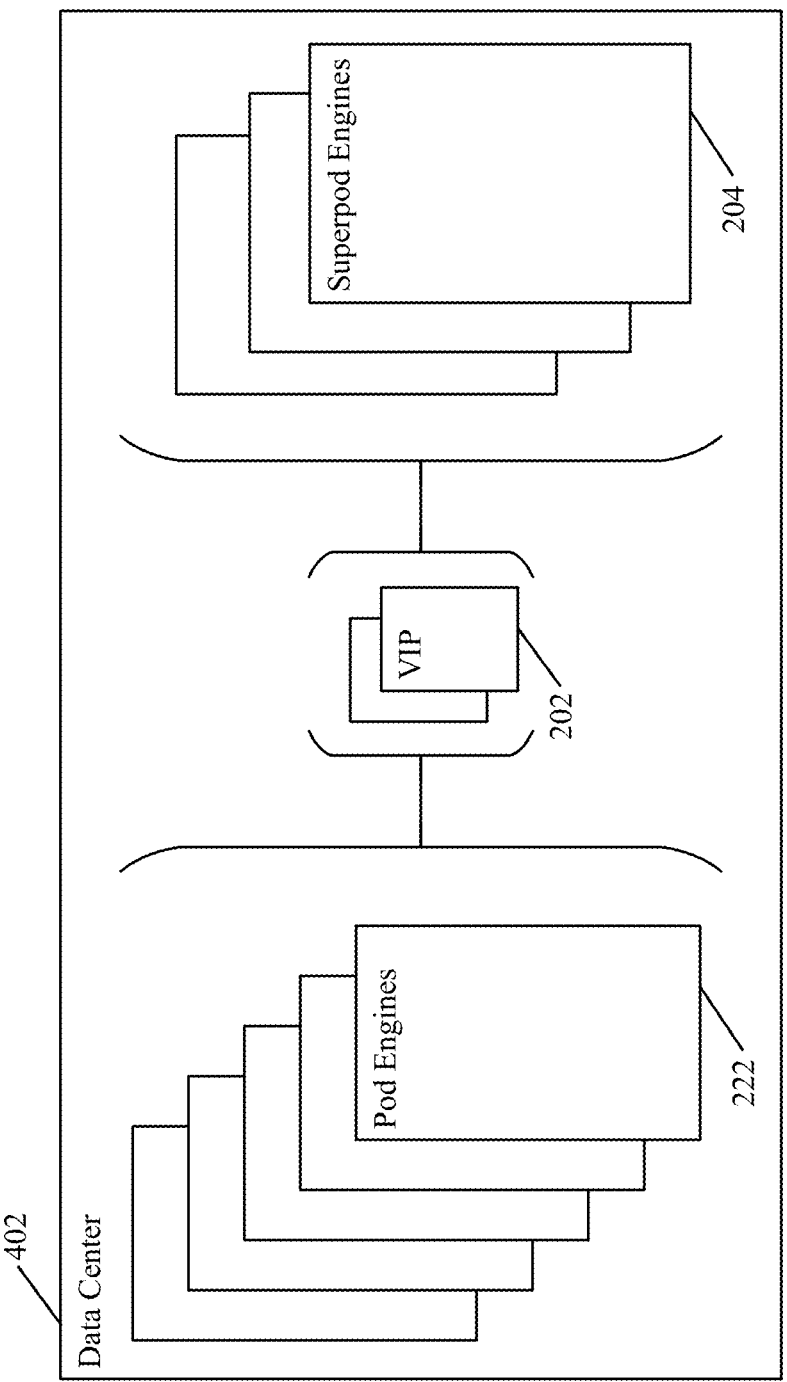
FIG. 4 – Integration Components

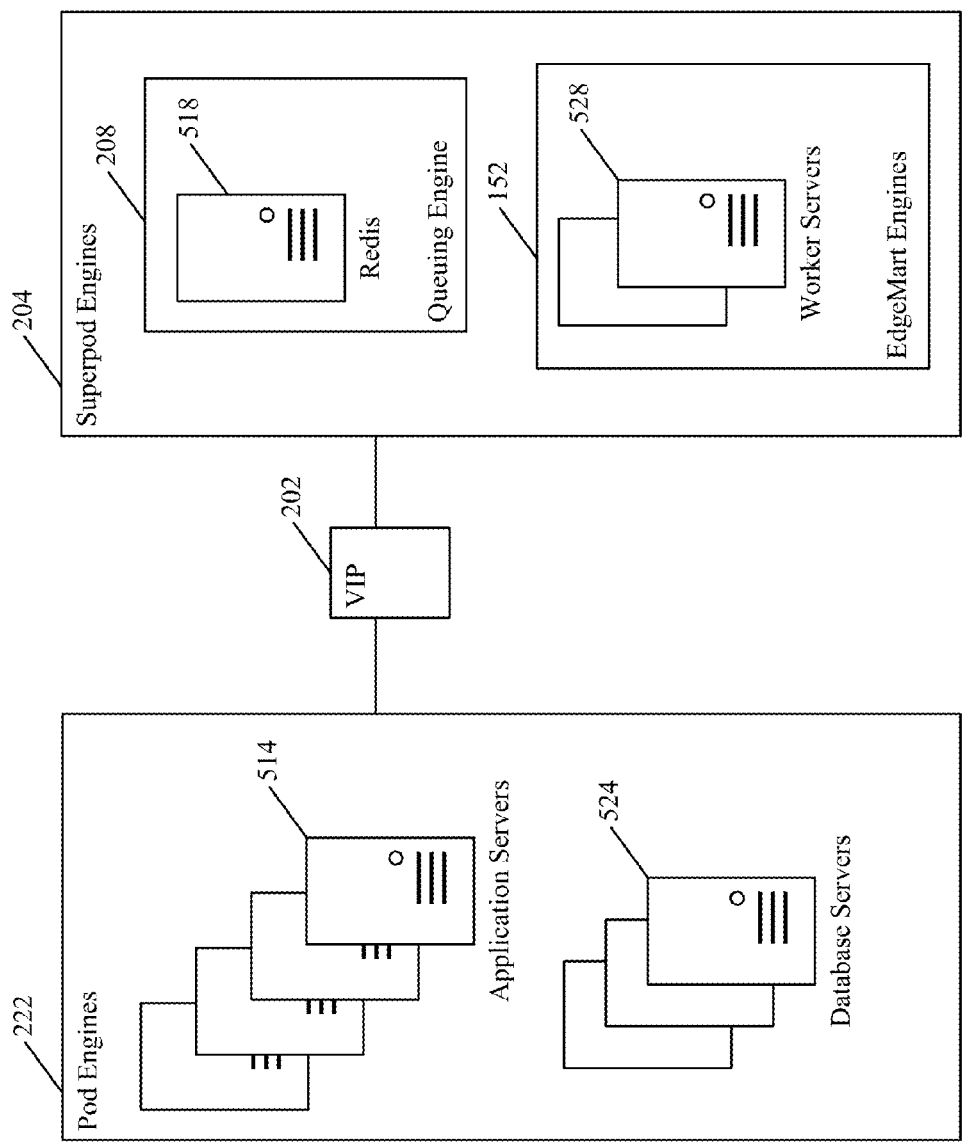
FIG. 5 – Pod and Superpod Components

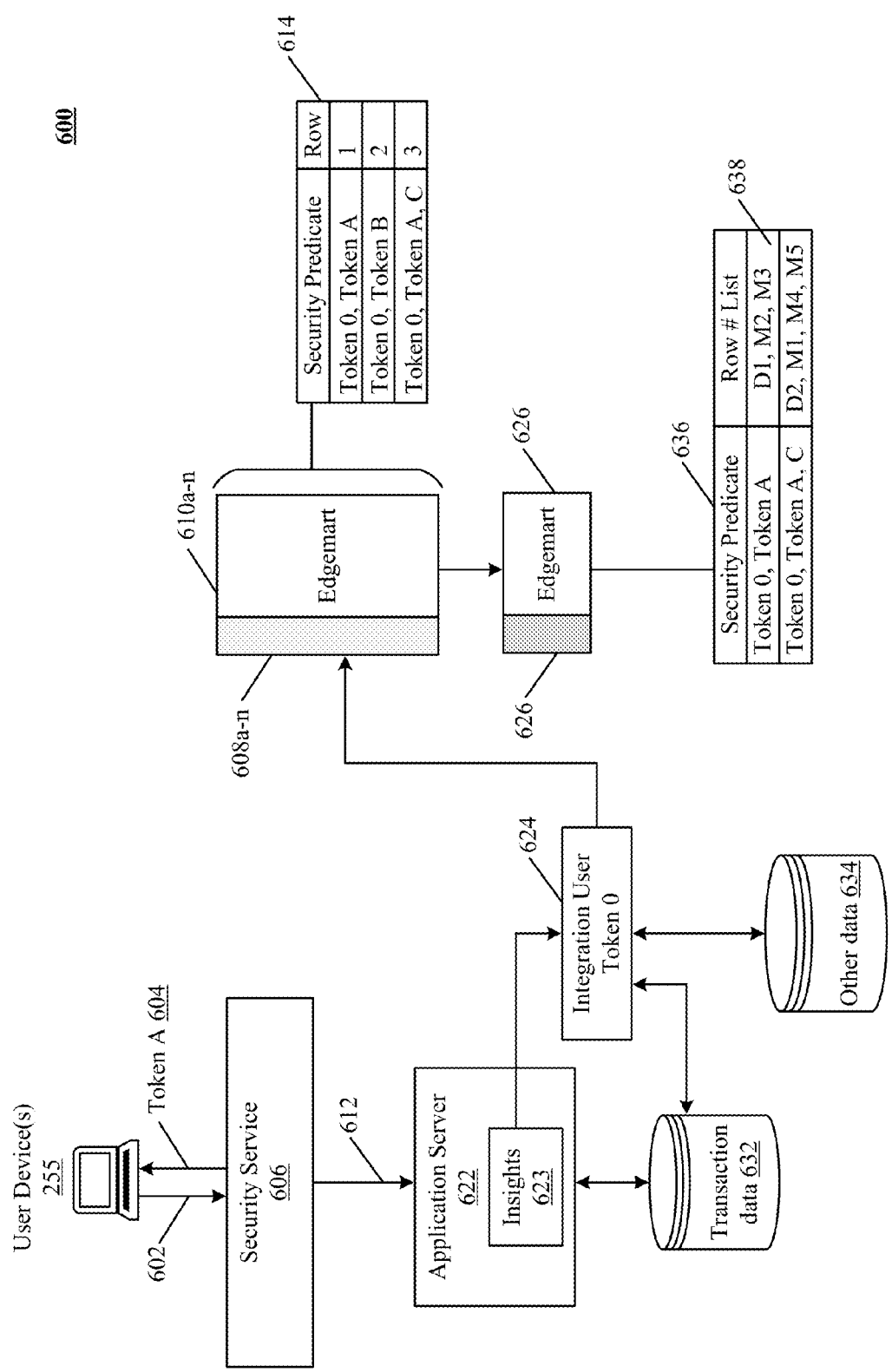
FIG. 6 – Integration User Application

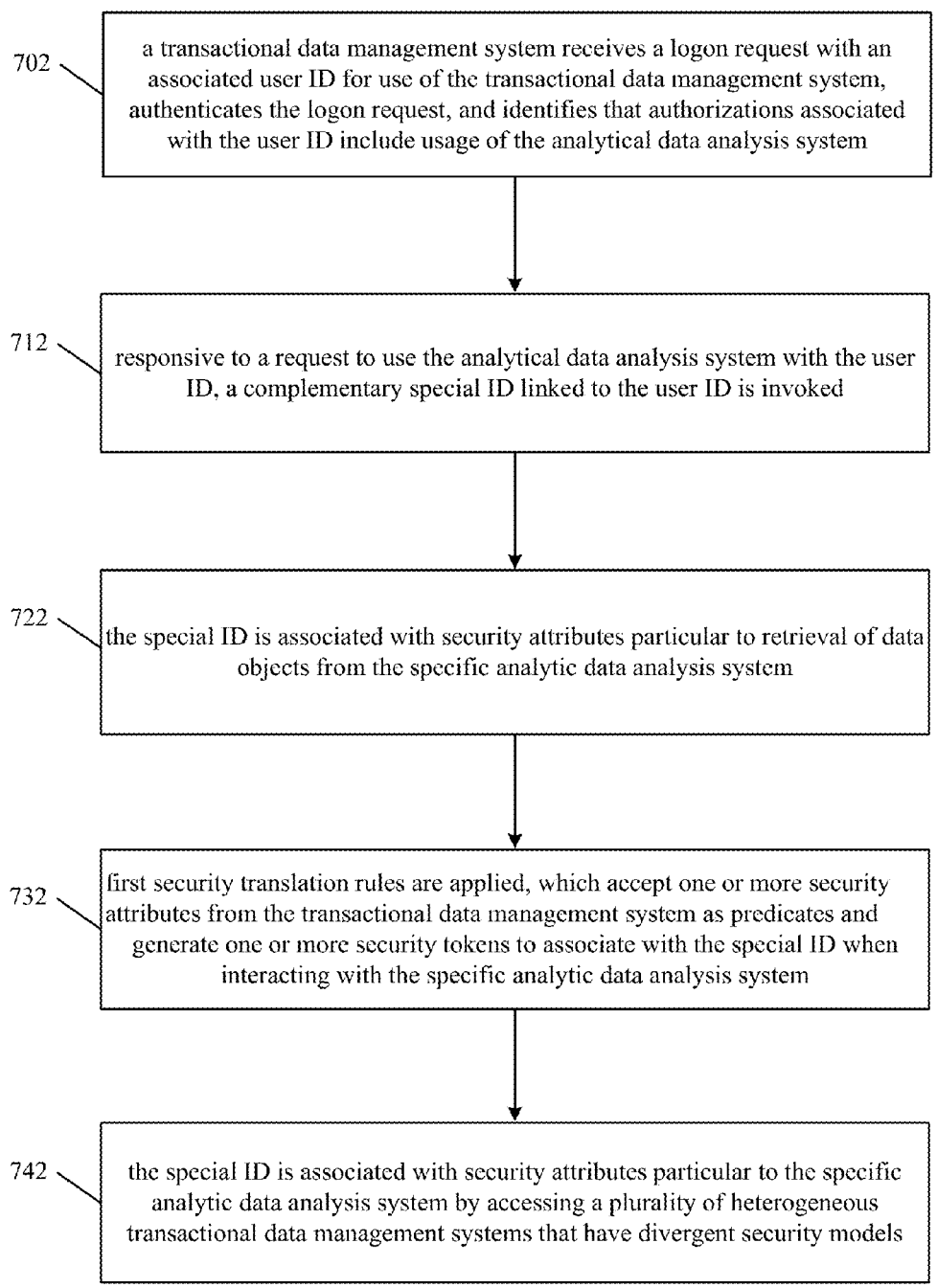
FIG. 7 – Controlling and Tracking Usage of Analytic Data Analysis System

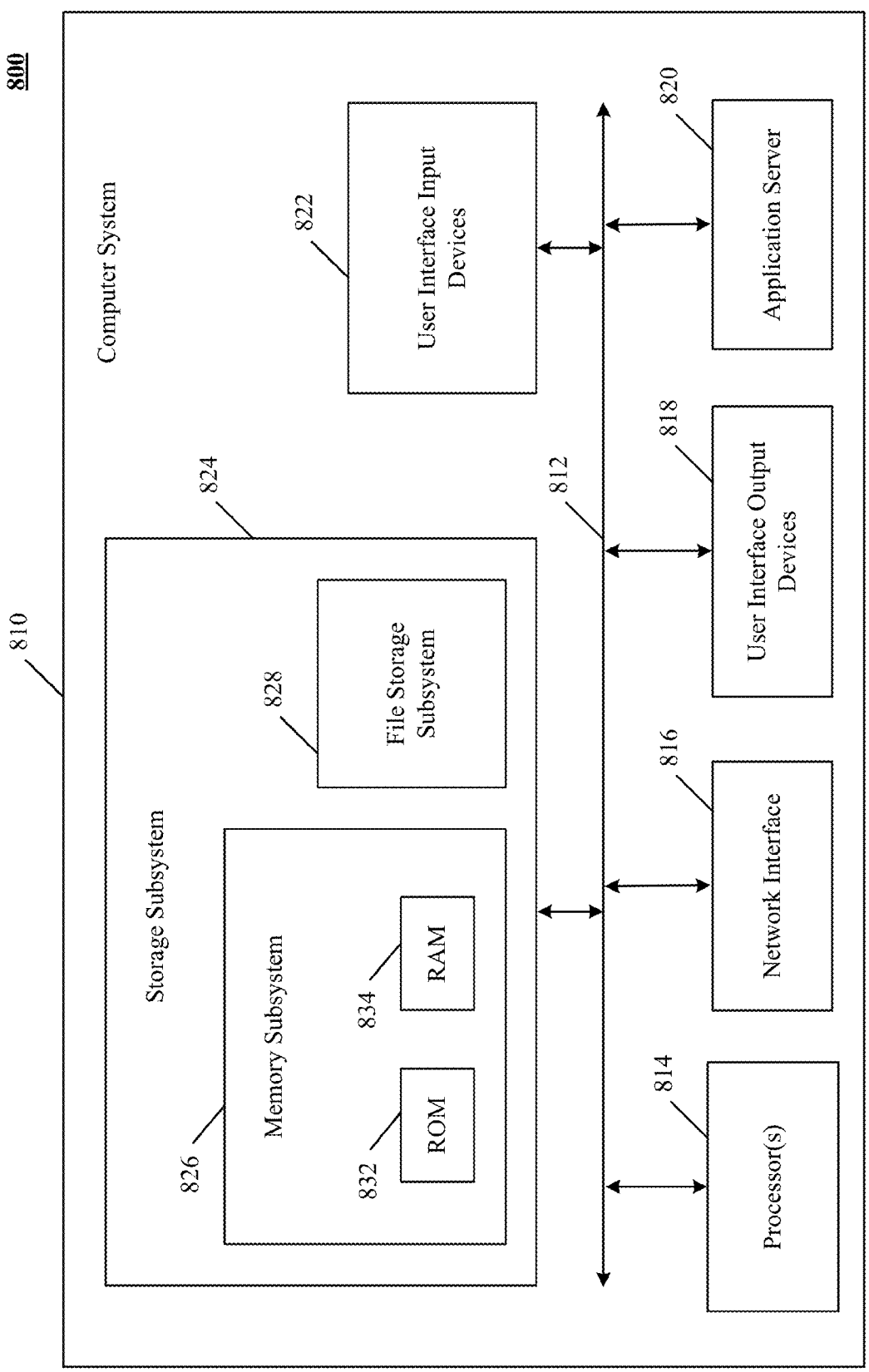
FIG. 8 – Computer System

INTEGRATION USER FOR ANALYTICAL ACCESS TO READ ONLY DATA STORES GENERATED FROM TRANSACTIONAL SYSTEMS

RELATED APPLICATIONS

This application is one of several U.S. Nonprovisional Patent Applications filed contemporaneously. The related applications are U.S. application Ser. No. 14/512,230 entitled, ROW-LEVEL SECURITY INTEGRATION OF ANALYTICAL DATA STORE WITH CLOUD ARCHITECTURE, filed on 10 Oct. 2014; U.S. application Ser. No. 14/512,240 entitled, LOW LATENCY ARCHITECTURE WITH DIRECTORY SERVICE FOR INTEGRATION OF TRANSACTIONAL DATA SYSTEM WITH ANALYTICAL DATA STRUCTURES, filed on 10 Oct. 2014; U.S. application Ser. No. 14/512,258 entitled VISUAL DATA ANALYSIS WITH ANIMATED INFORMATION MORPHING REPLAY, filed on 10 Oct. 2014; U.S. application Ser. No. 14/512,263 entitled DECLARATIVE SPECIFICATION OF VISUALIZATION QUERIES DISPLAY FORMATS AND BINDINGS; U.S. application Ser. No. 14/512,267 entitled DASHBOARD BUILDER WITH LIVE DATA UPDATING WITHOUT EXITING AN EDIT MODE, filed on 10 Oct. 2014 and U.S. application Ser. No. 14/512,274 entitled OFFLOADING SEARCH PROCESSING AGAINST ANALYTIC DATA STORES, filed on 10 Oct. 2014. The related applications are hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

The advent of powerful servers, large-scale data storage and other information infrastructure has spurred the development of advance data warehousing and data analytics applications. Structured query language (SQL) engines, on-line analytical processing (OLAP) databases and inexpensive large disk arrays have for instance been harnessed to capture and analyze vast streams of data. The analysis of that data can reveal valuable trends and patterns not evident from more limited or smaller-scale analysis.

In the case of transactional data management, the task of inspecting, cleaning, transforming and modeling data with the goal of discovering useful information is particularly challenging due to the complex relationships between different fields of the transaction data. Consequently, performance of conventional analytical tools with large transaction data sets has been inefficient. That is also in part because the time between requesting a particular permutation of data and that permutation's availability for review is directly impacted by the extensive compute resources required to process standard data structures. This heavy back-end processing is time-consuming and particularly burdensome to the server and network infrastructure.

The problem is worsened when an event occurs that renders the processing interrupted or stopped. In such an event, latency is incurred while waiting for the processing to re-initiate so that the appropriate action takes place. This latency is unacceptable for analytics applications that deliver real-time or near real-time reports. Accordingly, systems and methods that can alleviate the strain on the overall infrastructure are desired.

An opportunity arises to provide business users full ad hoc access for querying large-scale database management systems and rapidly building analytic applications by using efficient queueing protocols for faster creation and processing of massively compressed datasets. Improved customer experience and engagement, higher customer satisfaction and retention, and greater sales may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 1 illustrates an example analytics environment in which the technology disclosed can be used.

FIG. 2 is a high-level system diagram of an integration environment that can be used to implement the technology disclosed.

FIG. 3 depicts a high-level process of an extract-load-transform ELT workflow.

FIG. 4 illustrates one implementation of integration components of a data center used to implement aspects of the technology disclosed.

FIG. 5 shows one implementation of so-called pod and superpod components that can be used to implement the technology disclosed.

FIG. 6 demonstrates one implementation of using an integration user in the integration environment illustrated in FIG. 2.

FIG. 7 is a representative method of implementation of controlling and tracking usage of an analytic data analysis system associated with a transactional data management system.

FIG. 8 shows a high-level block diagram of a computer system that can be used to implement some features of the technology disclosed.

DETAILED DESCRIPTION

Introduction

The technology disclosed relates to integration between large-scale transactional systems and temporary analytic data stores suitable for use by one or more analysts. In other implementations, the technology disclosed relates to integration between large-scale transactional systems, non-structured data stores (e.g., log files), analytical systems (corporate data warehouse, department data marts), and personal data sources (spreadsheets, csv files).

Exploration of data without updating the underlying data presents a different use case than processing transactions. A data analyst may select, organize, aggregate and visualize millions or even hundreds of millions of transactional or log records without updating any of the records. So-called EdgeMart™ analytic data store technology, developed by EdgeSpring®, has been demonstrated to manipulate 123 million Federal Aviation Administration (FAA) records, on a laptop running a browser, with sub-one second response time for processing a query, including grouping, aggregation and result visualization. Storing the underlying records in a read only purpose designed analytic data structure makes these results possible using modest hardware. Producing, managing and operating analytic data stores at scale remains challenging.

Analytic data structures, also referred to as "edgemarts," are compressed data forms produced from transactional databases, which represent specific form functions of transactional database objects. Sometimes analytic data structures are produced by merging data from multiple database systems or platforms. For instance, prospect and opportunity closing data may come from a Salesforce.com® system and order fulfillment data from a SAP® system. An analytic data structure may combine sales and fulfillment data for particular opportunities, merging data from systems that run on different database platforms, in separate applications from different vendors, applying divergent security models. Dozens of analysts may work on subsets of an overall analytic data structure, both for periodic and ad hoc investigations. Their work is likely to be directed to a specific time period, such as last month, last quarter or the last 30 days. Different requirements of analysts can be accommodated using technology disclosed herein.

There are many aspects to addressing the challenge of scaling an analytic system architecture that draws from large scale transactional systems. First, the resources needed can be reduced by using a purposed designed low-latency messaging protocol between transactional system components and analytic data store components. Second, divergent security models of multiple transactional systems can be addressed by a predicate-based row-level security scheme capable of translating various security settings for use in an analytic data store. Security can be arranged in a manner that facilitates building individual shards of an analytical data store for users who either want or have access limited to a particular segment of the overall data.

Third, operation of an analytic data store can be facilitated by a separate accounting of analytic resource usage. The technology disclosed keeps the analytic resource usage accounting separate by associating a so-called integration user for analytic services with a standard transactional user. Transactional user credentials and processing of authentication and authorization can be leveraged to invoke the associated integration user. This associated user has different rights and different accounting rules that the transactional user.

Fourth, migration of query processing from servers to clients can mitigate high peak loads followed by idle periods observed when delivering extremely fast data exploration and visualization. The technology disclosed further includes a strategy for migration, during a particular investigation session, of query processing from server based to client based.

Low latency communication between a transactional system and analytic data store resources can be accomplished through a low latency key-value store with purpose-designed queues and status reporting channels. Posting by the transactional system to input queues and complementary posting by analytic system workers to output queues is described. On-demand production and splitting of analytic data stores requires significant elapsed processing time, so a separate process status reporting channel is described to which workers can periodically post their progress, thereby avoiding progress inquiries and interruptions of processing to generate report status. This arrangement produces low latency and reduced overhead for interactions between the transactional system and the analytic data store system.

A directory service associated queuing and transactional system to worker inter-process communications enables restarting of worker processes running on analytic system servers that fail. Workers running on separate servers and even in separate server racks are redundantly assigned affinities to certain queues and clients. When one of the redundant workers fails and restarts, the directory service provides information so that status and task information can be obtained by the restarted worker from the redundant sister workers. This keeps the workers from recreating edgemarts that were created while the worker was off-line, according to one implementation.

A predicate-based row level security system is used when workers build or split an analytical data store. According to one implementation, predicate-based means that security requirements of source transactional systems can be used as predicates to a rule base that generates one or more security tokens, which are associated with each row as attributes of a dimension. Similarly, when an analytic data store is to be split, build job, user and session attributes can be used to generate complementary security tokens that are compared to security tokens of selected rows. Efficient indexing of a security tokens dimension makes it efficient to qualify row retrieval based on security criteria.

Building analytical data stores from transactional data systems that have divergent security models is facilitated by predicate-based rules that translate transactional security models and attributes into security tokens, according to one implementation. For instance, Saleforce.com® allows a tenant to select among about seven different security models. Selecting any one of these models could make it difficult or impossible to express security requirements expressed according to a different model. Selecting one of the Salesforce.com® models could complicate expressing security requirements implemented under an SAP® security model. Predicate-based rules facilitate extracting data objects consistent with needs of analytical data structure users. A single analytical data store can be built for sharing among multiple users and for providing security consistent with underlying security models and analytical data access rights of users. Security tokens can be assigned to rows based on criteria such as "CEOs can access all transactional records for the last five years," which might not be implemented or expressed in the underlying transactional systems. It is expected that analysts will have access to records for analytical purposes that they might not be allowed to or might find cumbersome to access through the underlying transactional systems.

Splitting an analytical data store refers to creating a so-called shard, which is a second analytical data store created by selecting a proper subset of data objects or rows in a first analytical data store. This can be regularly scheduled, alongside refreshing of an analytical data store with updated data from the transactional data system. Or, it can happen on demand or on an ad hoc basis. The technology disclosed can be applied to create shards from larger analytical data stores. In one implementation, creating a subset of an edgemart for simultaneous storage and subsequent deployment along with the original edgemart is referred to as "physical splitting." In some implementations, physically splitting of edgemarts is performed over-night or through batch processing. In such implementations, the resulting shards are stored in a cache and are made available on-demand in response to user queries. In another implementation, providing a subset of data stored in an edgemart in response to a query without maintaining a separate subset edgemart is referred to as "logical splitting." In the logical splitting implementation, deployment of the subset of the edgemart's data is qualified based on authentication and authorization of a user who initiated the query.

Creating shards can be beneficial for regularly scheduled creation of analytical data stores, especially when production involves creation of multiple data stores with overlapping data. It has been observed that creation of user-requested, specific data stores can be brittle in the sense of easily breaking People leave and join analytical groups. Jobs are created and then forgotten. Underlying data changes. When dozens or hundreds of analytical data stores derive from a single shared set of data, process brittleness can be reduced by hierarchical creation of analytical data stores. A predicate-based row level security rule set facilitates hierarchical data store assembly.

An automated, hierarchical process of creating even two hierarchical levels of analytical data stores can benefit from predicate-based row level security rules. At a first hierarchical level, security tokens can be created and associated at a row level with data objects. The security tokens can encode security attributes that facilitate creation of the second or subsequent hierarchical levels of analytical data stores, given the flexibility afforded by predicate-based rules. A three level creation system can have additional benefits, related to structuring of patterns of analytical data store creation. The relationship among analytical data store children created from a single mother analytical data store can be more clearly revealed by multiple generations of relationships that correspond to three or more hierarchical levels.

After creation of analytical stores, use of a so-called integration user can control access rights and be used for accounting. By its nature, a temporary analytical data store involves much more limited rights to modify or update data than typical in a transactional data system. A typical user may have read/search rights to at least one analytical data store. Even if the user has write/update writes to the transactional data system(s) from which the analytical data stores are created, the user may only have read/search rights. The user may further have recreate-on-demand rights, but the read only nature of the analytical data store makes it unnecessary for the user to enjoy the write/update rights that the user has with the corresponding transactional data system. Or, the user's analytical data store rights may be restricted to a first company subdivision, even if the user occasionally contributes to results in a second company subdivision. In some implementations, the integration user can be given rights under a predicate-based set of security rules, but this is not necessary.

The transactional user also can facilitate accounting for analytical data store usage. Use of analytical data stores for high performance data exploration typically involves a fraction of the user base size that generates transactions. As mentioned above, their data exploration generates much higher peak loads than individual transactions. These conditions are likely to lead to different licensing conditions for analytical data store system users than for transactional system users.

Again, the so-called integration user keeps the analytic resource usage accounting separate by associating an integration user for analytic services with a standard transactional user. Transactional user credentials and processing of authentication and authorization can be leveraged to invoke the associated integration user. Then, the associated user's rights and accounting rules can be applied to meet analytic security and accounting needs with minimal burdens on the pre-existing transactional system.

Aggressive exploration can involve multiple, successive queries and visualizations. This creates difficulty scaling the resources needed to deliver fast responses. It is particularly complicated by regular rebuilding of analytic data stores, whether daily or on demand. Migrating queries using the technology described involves migrating indexed fields, known as dimensions, and quantity fields, known as measures, in the background during a query session. A session that starts in server query processing mode may switch to client query processing as enough data fields have been copied from the server to the client. When the client determines that it has enough data fields to process an incoming query, it can locally process the new query without passing it to the server. Since both the server and client are working from copies of the same read only analytic data structure, a user receives the same results from either client or the server.

These features individually and collectively contribute to integration of an analytic data store system with one or more legacy transactional systems.

The described subject matter is implemented by a computer-implemented system, such as a software-based system, a database system, a multi-tenant environment, or the like. Moreover, the described subject matter can be implemented in connection with two or more separate and distinct computer-implemented systems that cooperate and communicate with one another. One or more implementations can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied.

Examples of systems, apparatus, and methods according to the disclosed implementations are described in a "transaction data" context. The examples of transaction data are being provided solely to add context and aid in the understanding of the disclosed implementations. In other instances, other data forms and types related to other industries like entertainment, animation, docketing, education, agriculture, sports and mining, medical services, etc. may be used. Other applications are possible, such that the following examples should not be taken as definitive or limiting either in scope, context, or setting. It will thus be apparent to one skilled in the art that implementations may be practiced in or outside the "transaction data" context.

Analytics Environment

FIG. 1 illustrates an example analytics environment 100 in which the technology disclosed can be used. FIG. 1 includes an explorer engine 102, live dashboard engine 108, query engine 122, display engine 118, tweening engine 128 and tweening stepper 138. FIG. 1 also shows edgemart engine 152, runtime framework 125, user computing device 148 and application 158. In other implementations, environment 100 may not have the same elements or components as those listed above and/or may have other/different elements or components instead of, or in addition to, those listed above, such as a web engine, user store and notification engine. The different elements or components can be combined into single software modules and multiple software modules can run on the same hardware.

In analytics environment 100 a runtime framework with event bus 125 manages the flow of requests and responses between an explorer engine 102, a query engine 122 and a live dashboard engine 108. Data acquired (extracted) from large data repositories is used to create "raw" edgemarts 142—read-only data structures for analytics, which can be augmented, transformed, flattened, etc. before being published as customer-visible edgemarts for business entities. A query engine 122 uses optimized data structures and algorithms to operate on these highly-compressed edgemarts 142, delivering exploration views of this data. Accordingly, an opportunity arises to analyze large data sets quickly and effectively.

Visualization queries are implemented using a declarative language to encode query steps, widgets and bindings to capture and display query results in the formats selected by a user. An explorer engine 102 displays real-time query results. When activated by an analyst developer, explorer engine 102 runs EQL queries against the data and includes the data in lenses. A lens describes a single data visualization: a query plus chart options to render the query. The EQL language is a real-time query language that uses data flow as a means of aligning results. It enables ad hoc analysis of data stored in Edgemarts. A user can select filters to change query parameters and can choose different display options, such as a bar chart, pie chart or scatter plot—triggering a real-time change to the display panel—based on a live data query using the updated filter options. An EQL script consists of a sequence of statements that are made up of keywords (such as filter, group, and order), identifiers, literals, or special characters. EQL is declarative: you describe what you want to get from your query. Then, the query engine will decide how to efficiently serve it.

A runtime framework with an event bus 125 handles communication between a user application 158, a query engine 122 and an explorer engine 102, which generates lenses that can be viewed via a display engine 118. A disclosed live dashboard engine 108 designs dashboards, displaying multiple lenses from the explorer engine 102 as real-time data query results. That is, an analyst can arrange display panels for multiple sets of query results from the explorer engine 102 on a single dashboard. When a change to a global filter affects any display panel on the dashboard, the remaining display panels on the dashboard get updated to reflect the change. Accurate live query results are produced and displayed across all display panels on the dashboard.

Explorer engine 102 provides an interface for users to choose filtering, grouping and visual organization options; and displays results of a live query requested by a user of the application 158 running on a user computing device 148. The query engine 122 executes queries on read only prepackaged data sets—the edgemart data structures 142. The explorer engine 102 produces the visualization lens using the filter controls specified by the user and the query results served by the query engine 122.

Explorer engine 102, query engine 122 and live dashboard engine 108 can be of varying types including a workstation, server, computing cluster, blade server, server farm, or any other data processing system or computing device. In some implementations, explorer engine 102 can be communicably coupled to a user computing device 148 via different network connections, such as the Internet. In some implementations, query engine 122 can be communicably coupled to a user computing device 148 via different network connections, such as a direct network link. In some implementations, live dashboard engine 108 can be communicably coupled to user computing device 148 via different network connections, such as the Internet or a direct network link.

Runtime framework with event bus 125 provides real time panel display updates to the live dashboard engine 108, in response to query results served by the query engine 122 in response to requests entered by users of application 158. The runtime framework with event bus 125 sets up the connections between the different steps of the workflow.

Display engine 118 receives a request from the event bus 125, and responds with a first chart or graph to be displayed on the live dashboard engine 108. Segments of a first chart or graph are filter controls that trigger generation of a second query upon selection by a user. Subsequent query requests trigger controls that allow filtering, regrouping, and selection of a second chart or graph of a different visual organization than the first chart or graph.

Display engine 118 includes tweening engine 128 and tweening stepper 138 that work together to generate pixel-level instructions—intermediate frames between two images that give the appearance that the first image evolves smoothly into the second image. The drawings between the start and destination frames help to create the illusion of motion that gets displayed on the live dashboard engine 108 when a user updates data choices.

Runtime framework with event bus 125 can be of varying types including a workstation, server, computing cluster, blade server, server farm, or any other data processing system or computing device; and can be any network or combination of networks of devices that communicate with one another. For example, runtime framework with event bus 125 can be implemented using one or any combination of a LAN (local area network), WAN (wide area network), telephone network (Public Switched Telephone Network (PSTN), Session Initiation Protocol (SIP), 3G, 4G LTE), wireless network, point-to-point network, star network, token ring network, hub network, WiMAX, WiFi, peer-to-peer connections like Bluetooth, Near Field Communication (NFC), Z-Wave, ZigBee, or other appropriate configuration of data networks, including the Internet. In other implementations, other networks can be used such as an intranet, an extranet, a virtual private network (VPN), a non-TCP/IP based network, any LAN or WAN or the like.

Edgemart engine 152 uses an extract, load, transform (ELT) process to manipulate data served by backend system servers to populate the edgemart data structures 142. Edgemart data structures 142 can be implemented using a general-purpose distributed memory caching system. In some implementations, data structures can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

In some implementations, user computing device 148 can be a personal computer, a laptop computer, tablet computer, smartphone or other mobile computing device, personal digital assistant (PDA), digital image capture devices, and the like. Application 158 can take one of a number of forms, including user interfaces, dashboard interfaces, engagement consoles, and other interfaces, such as mobile interfaces, tablet interfaces, summary interfaces, or wearable interfaces. In some implementations, it can be hosted on a web-based or cloud-based privacy management application running on a computing device such as a personal computer, laptop computer, mobile device, and/or any other hand-held computing device. It can also be hosted on a non-social local application running in an on premise environment. In one implementation, application 158 can be accessed from a browser running on a computing device. The browser can be Chrome, Internet Explorer, Firefox, Safari, and the like. In other implementations, application 158 can run as an engagement console on a computer desktop application.

In other implementations, environment 100 may not have the same elements or components as those listed above and/or may have other/different elements or components instead of, or in addition to, those listed above, such as a web server and a template database. The different elements or components can be combined into single software modules and multiple software modules can run on the same hardware.

Integration Environment

FIG. 2 is a high-level system diagram of an integration environment 200 that can be used to implement the technology disclosed. FIG. 2 includes superpod engines 204, pod engines 222, edgemart engines 152, queuing engine 208 and security engines 245. FIG. 2 also shows load balancers 202, edgemarts 142, shards 216, transaction data 232, network(s) 225, security rules 242, local edgemarts 252 and web based users 255. In other implementations, environment 200 may not have the same elements or components as those listed above and/or may have other/different elements or components instead of, or in addition to, those listed above, such as a web engine, user store and notification engine. The different elements or components can be combined into single software modules and multiple software modules can run on the same hardware.

Network(s) 225 is any network or combination of networks of devices that communicate with one another. For example, network(s) 225 can be any one or any combination of a LAN (local area network), WAN (wide area network), telephone network (Public Switched Telephone Network (PSTN), Session Initiation Protocol (SIP), 3G, 4G LTE), wireless network, point-to-point network, star network, token ring network, hub network, WiMAX, WiFi, peer-to-peer connections like Bluetooth, Near Field Communication (NFC), Z-Wave, ZigBee, or other appropriate configuration of data networks, including the Internet. In other implementations, other networks can be used such as an intranet, an extranet, a virtual private network (VPN), a non-TCP/IP based network, any LAN or WAN or the like.

In some implementations, the various engines illustrated in FIG. 2 can be of varying types including workstations, servers, computing clusters, blade servers, server farms, or any other data processing systems or computing devices. The engines can be communicably coupled to the databases via different network connections. For example, superpod engines 204 and queuing engine 208 can be coupled via the network 115 (e.g., the Internet), edgemart engines 152 can be coupled via a direct network link, and pod engines 222 can be coupled by yet a different network connection.

In some implementations, a transaction data management system 232 can store structured, semi-structured, unstructured information from one or more tenants into tables of a common database image to form an on-demand database service (ODDS), which can be implemented in many ways, such as a multi-tenant database system (MTDS). A database image can include one or more database objects. In other implementations, the transaction data management system 232 can be a relational database management system (RDBMSs), an object oriented database management systems (OODBMSs), a distributed file systems (DFS), a no-schema database, or any other data storing system or computing device.

Web based users 255 can communicate with various components of the integration environment 200 using TCP/IP and, at a higher network level, use other common Internet protocols to communicate, such as HTTP, FTP, AFS, WAP, etc. As an example, where HTTP is used, web based users 255 can employ an HTTP client commonly referred to as a "browser" for sending and receiving HTTP messages from an application server included in the pod engines 222. Such application server can be implemented as the sole network interface between pod engines 222 and superpod engines 204, but other techniques can be used as well or instead. In some implementations, the interface between pod engines 222 and superpod engines 204 includes load sharing functionality 202, such as round-robin HTTP request distributors to balance loads and distribute incoming HTTP requests evenly over a plurality of servers in the integration environment.

In one aspect, the environment shown in FIG. 2 implements a web-based analytics application system, referred to as "insights." For example, in one aspect, integration environment 200 can include application servers configured to implement and execute insights software applications as well as provide related data, code, forms, web pages and other information to and from web based users 255 and to store to, and retrieve from, a transaction related data, objects and web page content. With a multi-tenant implementation of transactional database management system 232, tenant data is preferably arranged so that data of one tenant is kept logically separate from that of other tenants so that one tenant does not have access to another's data, unless such data is expressly shared. In aspects, integration environment 200 implements applications other than, or in addition to, an insights application and transactional database management systems. For example, integration environment 200 can provide tenant access to multiple hosted (standard and custom) applications, including a customer relationship management (CRM) application.

Queuing engine 208 defines a dispatching policy for the integration environment 200 to facilitate interactions between a transactional database system and an analytical database system. The dispatching policy controls assignment of requests to an appropriate resource in the integration environment 200. In one implementation of the dispatching policy, a multiplicity of messaging queues is defined for the integration environment, including a "named key-value task start queue" and a "named key-value task complete queue." The "named key-value task start queue" dispatches user requests for information. The "named key-value task complete queue" dispatches information that reports completion of the user requests. In other implementations, when either the processing time exceeds the maximum response time or the size of the data set exceeds the data threshold, a progress report can be sent to the user. The progress reports refers to information transmitted to advise an entity of an event, status, or condition of one or more requests the entity initiated.

Application of the multiplicity of messaging queues solves the technical problem of queue blockage in the integration environment 200. Contention is created when multiple worker threads use a single queue to perform their tasks. Contention in multi-threaded applications of queues can slow down processing in the integration environment 200 up to three orders, thus resulting in high latency. The condition is worsened when there are multiple writers adding to a queue and readers consuming. As a result, every time a request is written or added to a particular queue, there is contention between multiple worker threads since a reader concurrently attempts to read or remove from the same queue. In some implementations, integration environment 200 uses a pool of worker threads for reading or writing requests from or to clients in the network(s) 225. Worker threads are hosted on resources referred to as "workers." Once request is read into the "named key-value task start queue," it is dispatched for execution in the workers. The resulting data generated after the request is executed by the workers is referred is stored as edgemarts 142. In some implementations, the edgemarts 142 are portioned into multiple smaller edgemarts called shards 216, which can be stored as local edgemarts 252. In one implementation, edgemarts 142 are partitioned based on specified dimensions such as a range or a hash.

ELT Workflow

Various types of on-demand transactional data management systems can be integrated with analytic data stores to provide data analysts ad hoc access to query the transaction data management systems. This can facilitate rapid building of analytic applications that use numerical values, metrics and measurements to drive business intelligence from transactional data stored in the transaction data management systems and support organizational decision making Transaction data refers data objects that support operations of an organization and are included in application systems that automate key business processes in different areas such as sales, service, banking, order management, manufacturing, aviation, purchasing, billing, etc. Some examples of transaction data 232 include enterprise data (e.g. order-entry, supply-chain, shipping, invoices), sales data (e.g. accounts, leads, opportunities), aviation data (carriers, bookings, revenue), and the like.

Most often, the integration process includes accumulating transaction data of a different format than what is ultimately needed for analytic operations. The process of acquiring transaction data and converting it into useful, compatible and accurate data can include three, or more, phases such as extract, load and transform. In some implementations, the integration flow can include various integration flow styles. One such style can be Extract-Transform-Load (ETL), where, after extraction from a data source, data can be transformed and then loaded into a data warehouse. In another implementation, an Extract-Load-Transform (ELT) style can be employed, where, after the extraction, data can be first loaded to the data warehouse and then transformation operation can be applied. In yet another implementation, the integration can use an Extract-Transform-Load-Transform (ETLT) style, where, after the extraction, several data optimization techniques (e.g. clustering, normalization, denormalization) can be applied, then the data can be loaded to the data warehouse and then more heavy transformation operations can occur.

Extraction refers to the task of acquiring transaction data from transactional data stores, according to one implementation. This can be as simple as downloading a flat file from a database or a spreadsheet, or as sophisticated as setting up relationships with external systems that then control the transportation of data to the target system. Loading is the phase in which the captured data is deposited into a new data store such as a warehouse or a mart. In some implementations, loading can be accomplished by custom programming commands such as IMPORT in structured query language (SQL) and LOAD in Oracle Utilities. In some implementations, a plurality of application-programming interfaces (APIs) can be used, to interface with a plurality of transactional data sources, along with extraction connectors that load the transaction data into dedicated data stores.

Transformation refers to the stage of applying a series of rules or functions to the extracted or the loaded data, generally so as to convert the extracted or the loaded data to a format that is conducive for deriving analytics. Some examples of transformation include selecting only certain columns to load, translating coded values, encoding free-form values, deriving new calculated values, sorting, joining data from multiple sources, aggregation, de-normalization, transposing or pivoting data, splitting a column into multiple columns and data validation.

FIG. 3 depicts a high-level process 300 of an extract-load-transform ELT workflow. In one implementation, the edgemart engine 152 applies a reusable set of instructions referred to an "ELT workflow." ELT workflow comprises of—extracting data from a transactional data source 232 at action 303, loading the extracted data into an edgemart 306 at action 305, transforming the loaded data into the edgemart 306 at actions 307 and 317 and making the resulting data available in an analytic application (described in FIG. 7). In some implementations of the ELT workflow, transaction data 232 is first converted into a comma-separated value (CSV) or binary format or JSON format 304 and then loaded into an edgemart 306, as show in FIG. 3. In other implementations, transaction data 232 is extracted and loaded directly into edgemart 316 at action 313. In one implementation, ELT workflow runs on a daily schedule to capture incremental changes to transaction data and changes in the ELT workflow logic. Each ELT workflow run that executes a task is considered an ELT workflow job. During the initial ELT workflow job, the ELT workflow extracts all data from the specified transaction data objects and fields. After the first run, the ELT workflow extracts incremental changes that occurred since the previous job run, according to one implementation.

In some implementations, ELT workflow generates a so-called precursor edgemart by performing lightweight transformations on the transaction data. One example of a light-weight transformation is denormalization transformation. A denormalization transformation reintroduces some number of redundancies that existed prior to normalization of the transaction data 232, according to one implementation. For instance, a denormalization transformation can remove certain joins between two tables. The resulting so-called precursor edgemart has lesser degrees of normal norms relative to the transaction data, and thus is more optimum for analytics operations such as faster retrieval access, multidimensional indexing and caching and automated computation of higher level aggregates of the transaction data.

In other implementations, the loaded data can undergo a plurality of heavy-weight transformations, including joining data from two related edgemarts, flattening the transaction role hierarchy to enable role-based security, increasing query performance on specific data and registering an edgemart to make it available for queries. Depending on the type of transformation, the data in an existing edgemart is updated or a new edgemart is generated.

In one implementation of the heavy-weight transformations, an augment transformation joins data from two edgemarts to enable queries across both of them. For instance, augmenting a "User EdgeMart" with an "Account EdgeMart" can enable a data analyst to generate query that displays all account details, including the names of the account owner and creator. Augmentation transformation creates a new edgemart based on data from two input edgemarts. Each input edgemart can be identified as the left or right edgemart. The new edgemart includes all the columns of the left edgemart and appends only the specified columns from the right edgemart. Augmentation transformation performs a left, outer join, where the new edgemart includes all rows from the left edgemart and only matched rows from the right edgemart. In another implementation, queries can be enabled that span more than two edgemarts. This can be achieved by augmenting two edgemarts at a time. For example, to augment three edgemarts, a first two edgemarts can be augmented before augmenting the resulting edgemart with a third edgemart.

In some implementations, a join condition in the augment transformation can be specified to determine how to match rows in the right edgemart to those in the left edgemart. The following example illustrates a single-column join condition. To augment the following edgemarts based on single-column key, an "Opportunity" is assigned as the left edgemart and an "Account" is assigned as the right edgemart. Also, "OpptyAcct" is specified as the relationship between them.

| Opportunity EdgeMart | Account EdgeMart |
|---|---|
| ID | *ID |
| Opportunity_Name | Account_Name |
| Amount | Annual_Revenue |
| Stage | Billing_Address |
| Closed_Date | |
| *Account_ID | |

Upon running an ELT workflow job, an "OpptyAcct" prefix is added to all account columns and the edgemarts are joined based on a key defined as "Opportunity.Account_ID=Account.ID." After running the ELT workflow job to augment the two input edgemarts, the resulting edgemart includes the following columns:
Opportunity-Account EdgeMart
ID
Opportunity_Name
Amount
Stage
Closed_Date
Account_ID
OpptyAcct.Account_Name
OpptyAcct.Annual_Revenue
OpptyAc ct.Billing_Address In other implementations, different heavy-weight transformations can be applied, including flatten transformation to create role-based access on accounts, index transformation to index one dimension column in an edgemart, Ngram transformation to generate case-sensitive, full-text index based on data in an edgemart, register transformation to register an edgemart to make it available for queries and extract transformation to extract data from fields of a data object.
Integration Components FIG. 4 illustrates one implementation of integration components 400 of a data center 402 used to implement aspects of the technology disclosed. In this implementation, the pod engines 222 comprise of application servers 514 and database servers 524. The superpod engines 204 comprise of a queuing engine 208 and edgemart engines 152 that are hosted on one or more worker servers 528 within each superpod engine. A cluster of VIP servers 202 is used for load balancing to delegate ELT workflow initiated within the pod engines 222 to the worker servers 528 within the superpod engines 204. In the implementation depicted in FIG. 4, the pod engines 222, VIP servers 202 and superpod engines 204 are all within the same data center 402. Also, the example shown in FIG. 4 has are twelve pod engines 222, two VIP servers 202 and five superpod engines 204.

FIG. 5 shows one implementation of so-called pod and superpod components 500 that can be used to implement the technology disclosed. According to one implementation, each pod engine can support forty servers (thirty six application servers 514 and four database servers 524). Each superpod engine can support eighteen servers, according to another implementation. The application servers 514, upon receiving a request from a browser serving the web based users 255, accesses the database servers 524 to obtain information for responding to the user requests. In one implementation, application servers 514 generate an HTML document having media content and control tags for execution of the user requested operations based on the information obtained from the database servers 524. In another implementation, application servers 514 are configured to provide web pages, forms, applications, data and media content to web based users 255 to support the access by the web based users 255 as tenants of the transactional database management system 232. In aspects, each application server 514 is configured to handle requests for any user/organization.

In one implementation, an interface system 202 implementing a load balancing function (e.g., an F5 Big-IP load balancer) is communicably coupled between the servers 514 and the superpod engine 204 to distribute requests to the worker servers 528. In one aspect, the load balancer uses at least virtual IP (VIP) templates and connections algorithm to route user requests to the worker servers 528. A VIP template contains load balancer-related configuration settings for a specific type of network traffic. Other examples of load balancing algorithms, such as round robin and observed response time, also can be used. For example, in certain aspects, three consecutive requests from the same user could hit three different worker servers, and three requests from different users could hit the same worker server. In this manner, transactional database management system 232 is multi-tenant, wherein integration environment handles storage of, and access to, different objects, data and applications across disparate users and organizations.

Superpod engines 204 also host the queuing engine 208, which in turn implements a key-value server 518 that is in communication with a key-value store. Key-value store is a type of storage that enables users to store and read data (values) with a unique key. In some implementations, a key-value store stores a schema-less data. This data can consist of a string that represents the key and the actual data is the value in the "key-value" relationship. According to one implementation, the data itself can be any type of primitive of the programming langue such as a string, an integer, or an array. In another implementation, it can be an object that binds to the key-value store. Using a key-value store replaces the need of fixed data model and makes the requirement for properly formatted data less strict. Some popular examples of different key-value stores include Redis, CouchDB, Tokyo Cabinet and Cassandra. The example shown in FIG. 5 uses a Redis based key-value store. Redis is a database implementing a dictionary where keys are associated with values. For instance, a key "topname_2014" can be set to the string "John." Redis supports the storage of relatively large value types, including string (string), list (list), set (collection), zset (set-ordered collection of sorted) and hashs (hash type) and so on.

In some implementations, queuing engine 208 sets server affinity for a user and/or organization to a specific work server 528 or to a cluster of worker servers 528. Server affinity refers to the set up that a server or servers in a same cluster are dedicated to service requests from the same client, according to one implementation. In another implementation, server affinity within a cluster of servers refers to the set up that when a server in the cluster fails to process a request, then the request can only be picked by another server in the cluster. Server affinity can be achieved by configuring the load balancers 202 such that they are forced to send requests from a particular client only to corresponding servers dedicated to the particular client. Affinity relationships between clients and servers or server clusters are mapped in a directory service. Directory service defines a client name and sets it to an IP address of a server. When a client name is affinitized to multiple servers, client affinity is established once a request's destination IP address matches the cluster's global IP address.

Integration User

In one implementation, transaction data 232 is a multi-tenant database system. With a multi-tenant database system, tenant data is preferably arranged so that data of one tenant is kept separate from that of other tenants so that one tenant does not have access to another's data, unless such data is expressly shared. In a multi-tenant implementation, transaction data 232 can be divided into individual tenant storage areas, which can be either a physical arrangement or a logical arrangement. Within each tenant storage area, user storage can be similarly be allocated for each user, according to some implementations. In addition, different users or groups of users belonging to a particular tenant can have varying levels of data access. Thus, it becomes imperative that the process of creating edgemarts and controlling access to the created edgemarts takes into account the tenant specificity and user specificity of the transaction data 232, from which the edgemarts are extracted.

In other implementations, updates to the security model employed by the tenants due to personnel or hierarchical changes may not be automatically accounted for by the analytic data analysis system. For example, when a first finance analyst is replaced by a second finance analyst, the task of deleting the access of the first finance analyst from all of the relevant systems and services and adding the second finance analyst to all of the relevant systems and services can be cumbersome. In yet other implementations, if access to data related to accounting of analytic resource usage is controlled by user IDs, then it would be impossible to separate normal usage by the user ID from the access required to create edgemarts.

One possible solution to this problem is that a standard service ID can be generated for each system and service involved in creating, managing and analyzing edgemarts. This would allow one or more service IDs associated to a tenant the rights to create, manage and analyze edgemarts. However, there wouldn't be any traceability between the work done by a service ID(s) and the corresponding requestor, and further there wouldn't be a link to the security model employed by the tenant. Moreover, service IDs are created and managed outside of normal transaction processing systems. Each service ID would need to be configured to access only the data assigned to its tenant. A major problem with this solution is that each user of the tenant would need to know the service ID and password. Consequently, as users would join and leave an organization, service IDs would become increasingly difficult to manage and secure.

The technology disclosed preserves the tenant specificity and user specificity of the tenant data 232 by associating user IDs to complementary special IDs referred to as the "integration user(s) 258." In particular, it combines the traceability of user actions, the integration of security models and the flexibility of a service ID into one integration user(s) 258. As a result, the different tenants don't have to create or repurpose their respective security policies from time to time.

Regarding the integration user(s) 258, the integration user(s) 258 can be created automatically upon the installation of an Insights® tool on an application server 514, according to one implementation. In some implementations, it can be activated and deactivated in response to user configuration. In other implementations, at least one integration user(s) 258 is assigned on per tenant basis. In yet other implementations, the integration user(s) 258 receives a name based on the security model used by the tenant to which the integration user(s) 258 is assigned. In some implementations, the integration user(s) 258 is granted read-only rights over part, or all, of the tenant's data stored in the transaction data 232. In other implementations, integration user(s) 258 serves as a public ID (per tenant) that can be linked by proxy to any ID making edgemart requests to the application server 514, and to any system or service that processes edgemarts. In yet other implementations, the accounting for the data access initiated by the integration user ID is separate from the requesting user ID, which simplifies tenant licensing. In some other implementations, integration user(s) 258 can enhance the security of the transaction data management system 232 by locking down extraction of the transaction data 232. In such an implementation, APIs used to interface with the transactional data sources, along with extraction connectors that load the transaction data into dedicated data stores, can be locked down by asserting that the requestor is the trusted integration user(s) 258.

FIG. 6 demonstrates one implementation 600 of using an integration user in the integration environment 200 illustrated in FIG. 2. In one implementation, a user attempts to log into 602 a user device 225 via a security service 606. Once authorized, the user device 225 is granted a security token A 604. The user device then requests an edgemart 610a, known as an initial edgemart, from the application server 622. The Insights® module 623 within the application server 622 accepts the request to create an edgemart 610a. Following this, the Insights module 623 assigns the request to an edgemart engine 152 using the integration user ID 624 that has a security token 0. Further, the Insights module 623 associates all activities done by the integration user 624 for this request to the user signed into the user device 255.

Advancing further, the edgemart engine 152, using the integration user account 624, runs an extract of the transaction data 632 (or other data source), and loads the data into the edgemart 610a. In addition, the query running under the integration user ID 624 extracts the security tokens from the transaction data 632 and records them in the predicate table 608a. Security predicates are derived from the security model in the transaction data 632, and designate which rows can be seen by which users. In the example shown in FIG. 6, the user at user device 255 that initiated the query with token A 604 can see rows 1 and 3 614. The integration user with token 0 624 can see all rows in the edgemart 614. An integration user from some other tenant would have a different unique, token. The integration user 624 then engages with the services to register the edgemarts with the Redis server 518, the transaction database 524, and complete the workflow that informs the requesting user that the job is complete. The integration user is also used for any transformation, augmentation, or flattening (denormalization) required on the edgemart and is also responsible for the automated application of data filters when the explorer engine 102 changes to a new context on server-side edgemarts.

Use of analytical data stores for high performance data exploration typically involves a fraction of the user base size that generates transactions. Data exploration generates much higher peak loads than individual transactions. These conditions are likely to lead to different licensing conditions for analytical data store system users than for transactional system users.

In another implementation, a user who has logged into a user device 255 with token A 604 is requesting a split of the first edgemart 610a. The Insights module 623 associated the user with token A 604 to the integration user 624, and submits the request to split the first edgemart 610a into a second edgemart 625 to the edgemart engine 152. The edgemart engine 152 then executes the query to split the edgemart 610a using the integration user with token 0 624 to schedule the job, but uses the user token A 604 for the security predicate 626. This results in the second edgemart 625 created with the integration user token 0 624 with only the data viewable by the user with token A 604. The results are rows 1 and 3 614 of the edgemart 610a where token A is part of the security predicate. The data available for access by the integration user 624 also comprises sources including, but not limited to non-transactional data, Excel spreadsheets, JSON files, and CSV files.

Controlling and Tracking Usage of Analytic Data Analysis System

FIG. 7 is a representative method 700 of implementation of controlling and tracking usage of an analytic data analysis system associated with a transactional data management system. Flowchart 700 can be implemented at least partially with a database system, e.g., by one or more processors configured to receive or retrieve information, process the information, store results, and transmit the results. For convenience, this flowchart is described with reference to the system that carries out a method. The system is not necessarily part of the method. Other implementations may perform the steps in different orders and/or with different, fewer or additional steps than the ones illustrated in FIG. 7. The actions described below can be subdivided into more steps or combined into fewer steps to carry out the method described using a different number or arrangement of steps.

At action 702, a transactional data management system receives a logon request with an associated user ID for use of the transactional data management system, authenticates the logon request, and identifies that authorizations associated with the user ID include usage of the analytical data analysis system.

At action 712, responsive to a request to use the analytical data analysis system with the user ID, a complementary special ID linked to the user ID is invoked. In one implementation, the special ID grants rights related to a specific analytic data analysis system. In other implementations, the special ID rights provide read-only access to at least one analytic data store accessed through the specific analytic data analysis system. In yet another implementation, use of the special ID is separately licensed and accounted for from the user ID.

At action 722, the special ID is associated with security attributes particular to retrieval of data objects from the specific analytic data analysis system.

At action 732, first security translation rules are applied, which accept one or more security attributes from the transactional data management system as predicates and generate one or more security tokens to associate with the special ID when interacting with the specific analytic data analysis system. In one implementation, the security tokens govern access using the special ID to objects managed by the specific analytic data analysis system.

At action 742, the special ID is associated with security attributes particular to the specific analytic data analysis system by accessing a plurality of heterogeneous transactional data management systems that have divergent security models. Also, data in the plurality of transactional data management systems is accessed and objects that merge the data from two or more of the transactional data management systems are created. In addition, first security translation rules (security rules 242) are processed that accept the data set security attributes from the two or more transactional data management systems as predicates and generate one or more security tokens to associate with each secured object that merges the data.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations in sections of this application such as analytics environment, integration environment, ELT workflow, integration components, row-level security, integration, etc.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

Computer System

FIG. 8 shows a high-level block diagram 800 of a computer system that can used to implement some features of the technology disclosed. Computer system 810 typically includes at least one processor 814 that communicates with a number of peripheral devices via bus subsystem 812. These peripheral devices can include a storage subsystem 824 including, for example, memory devices and a file storage subsystem, user interface input devices 822, user interface output devices 818, and a network interface subsystem 816. The input and output devices allow user interaction with computer system 810. Network interface subsystem 816 provides an interface to outside networks, including an interface to corresponding interface devices in other computer systems.

User interface input devices 822 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 810.

User interface output devices 818 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules and methods described herein. These software modules are generally executed by processor 814 alone or in combination with other processors.

Memory 826 used in the storage subsystem can include a number of memories including a main random access memory (RAM) 830 for storage of instructions and data during program execution and a read only memory (ROM) 832 in which fixed instructions are stored. A file storage subsystem 828 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 828 in the storage subsystem 824, or in other machines accessible by the processor.

Bus subsystem 812 provides a mechanism for letting the various components and subsystems of computer system 810 communicate with each other as intended. Although bus subsystem 812 is shown schematically as a single bus, alternative implementations of the bus subsystem can use multiple busses. Application server 820 can be a framework that allows the applications of computer system 810 to run, such as the hardware and/or software, e.g., the operating system.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as one example. Many other configurations of computer system 810 are possible having more or fewer components than the computer system depicted in FIG. 8.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A computer-implemented method of controlling and tracking usage of an analytic data analysis system associated with a transactional data management system, the method including:
 a transactional data management system that manages data stored in a transaction data store receiving a logon request with an associated user ID for use of the transactional data management system, authenticating the logon request, and identifying that authorizations associated with the user ID include usage of the analytical data analysis system;
 wherein the analytical data analysis system responds to requests to visualize data stored in an analytic data store that is a subset of, but not all of, the data stored in the transactional data store; and
 responsive to a request to use the analytical data analysis system with the user ID, invoking a complementary special ID linked to the user ID, wherein
 the special ID grants rights related to a specific analytic data analysis system;
 the special ID rights provide read-only access to at least one analytic data store accessed through the specific analytic data analysis system; and
 use of the transactional data management system is separately licensed and accounted for from the analytical data analysis system.

2. The computer-implemented method of claim 1, further including:
 associating with the special ID security attributes particular to retrieval of data objects from the specific analytic data analysis system.

3. The computer-implemented method of claim 1, further including:
 applying first security translation rules that accept one or more security attributes from the transactional data management system as predicates; and
 generating one or more security tokens to associate with the special ID when interacting with the specific analytic data analysis system; and
 wherein the security tokens govern access using the special ID to objects managed by the specific analytic data analysis system.

4. The computer-implemented method of claim 1, further including:
 associating with the special ID security attributes particular to the specific analytic data analysis system by accessing a plurality of heterogeneous transactional data management systems that have divergent security models;
 accessing data in the plurality of transactional data management systems and creating objects that merge the data from two or more of the transactional data management systems; and
 processing first security translation rules that accept the data set security attributes from the two or more transactional data management systems as predicates and generating one or more security tokens to associate with each secured object that merges the data.

5. An apparatus to control and track usage of an analytic data analysis system associated with a transactional data management system, the apparatus comprising:
 a computer including a processor;
 a memory coupled to the processor, wherein the memory includes computer program instructions causing the computer to implement a process including:
 a transactional data management system that manages data stored in a transaction data store receiving a logon request with an associated user ID for use of the transactional data management system, authenticating the logon request, and identifying that authorizations associated with the user ID include usage of the analytical data analysis system;
 wherein the analytical data analysis system responds to requests to visualize data stored in an analytic data store that is a subset of, but not all of, the data stored in the transactional data store; and responsive to a request to use the analytical data analysis system with the user ID, invoking a complementary special ID linked to the user ID, wherein
the special ID grants rights related to a specific analytic data analysis system;
the special ID rights provide read-only access to at least one analytic data store accessed through the specific analytic data analysis system; and
use of the transactional data management system is separately licensed and accounted for from the analytical data analysis system.

6. The apparatus of claim 5, further including computer program instructions causing the computer to implement a process including:
associating with the special ID security attributes particular to retrieval of data objects from the specific analytic data analysis system.

7. The apparatus of claim 5, further including computer program instructions causing the computer to implement a process including:
applying first security translation rules that accept one or more security attributes from the transactional data management system as predicates; and
generating one or more security tokens to associate with the special ID when interacting with the specific analytic data analysis system; and
wherein the security tokens govern access using the special ID to objects managed by the specific analytic data analysis system.

8. The apparatus of claim 5, further including computer program instructions causing the computer to implement a process including:
associating with the special ID security attributes particular to the specific analytic data analysis system by accessing a plurality of heterogeneous transactional data management systems that have divergent security models;
accessing data in the plurality of transactional data management systems and creating objects that merge the data from two or more of the transactional data management systems; and
processing first security translation rules that accept the data set security attributes from the two or more transactional data management systems as predicates and generating one or more security tokens to associate with each secured object that merges the data.

9. A non-transitory computer-readable storage medium storing computer program instructions that cause a computer to implement a process including:
a transactional data management system that manages data stored in a transaction data store receiving a logon request with an associated user ID for use of the transactional data management system, authenticating the logon request, and identifying that authorizations associated with the user ID include usage of the analytical data analysis system;

wherein the analytical data analysis system responds to requests to visualize data stored in an analytic data store that is a subset of, but not all of, the data stored in the transactional data store; and responsive to a request to use the analytical data analysis system with the user ID, invoking a complementary special ID linked to the user ID, wherein
the special ID grants rights related to a specific analytic data analysis system;
the special ID rights provide read-only access to at least one analytic data store accessed through the specific analytic data analysis system; and
use of the transactional data management system is separately licensed and accounted for from the analytical data analysis system.

10. A non-transitory computer-readable storage medium of claim 9, further including computer program instructions that cause the computer to implement a process including:
associating with the special ID security attributes particular to retrieval of data objects from the specific analytic data analysis system.

11. A non-transitory computer-readable storage medium of claim 9, further including computer program instructions that cause the computer to implement a process including:
applying first security translation rules that accept one or more security attributes from the transactional data management system as predicates;
generating one or more security tokens to associate with the special ID when interacting with the specific analytic data analysis system; and
wherein the security tokens govern access using the special ID to objects managed by the specific analytic data analysis system.

12. A non-transitory computer-readable storage medium of claim 9, further including computer program instructions that cause the computer to implement a process including:
associating with the special ID security attributes particular to the specific analytic data analysis system by accessing a plurality of heterogeneous transactional data management systems that have divergent security models;
accessing data in the plurality of transactional data management systems and creating objects that merge the data from two or more of the transactional data management systems; and
processing first security translation rules that accept the data set security attributes from the two or more transactional data management systems as predicates and generating one or more security tokens to associate with each secured object that merges the data.

* * * * *